United States Patent [19]

Rieger et al.

[11] 4,390,053

[45] Jun. 28, 1983

[54] ANTI-SLIP CHAIN FOR VEHICLE TIRES

[75] Inventors: Hansjörg Rieger, Aalen; Dietmar Holzwarth, Schwäbisch-Gmünd, both of Fed. Rep. of Germany

[73] Assignee: RUD-Kettenfabrik Rieger 6 Dietz GmbH u. Co., Aalen, Fed. Rep. of Germany

[21] Appl. No.: 301,758

[22] Filed: Aug. 9, 1981

[30] Foreign Application Priority Data

Sep. 18, 1980 [CH] Switzerland .......................... 7020/80

[51] Int. Cl.³ .............................................. B60C 27/00
[52] U.S. Cl. ................................ 152/213 A; 152/219;
152/224; 152/242; 152/244
[58] Field of Search ............... 152/213 R, 213 A, 216,
152/217, 218, 219, 224, 231, 239, 240, 241–244;
81/15.8; 59/84, 93, 90; 24/68 TT, 68 CT

[56] References Cited

U.S. PATENT DOCUMENTS

| 1,395,057 | 10/1921 | Nelson | 152/218 |
| 2,130,293 | 9/1938 | Bonforte | 152/242 |
| 2,537,392 | 1/1951 | Bettcher | 152/241 |

FOREIGN PATENT DOCUMENTS 2254409  5/1974  Fed. Rep. of Germany ...... 152/217

Primary Examiner—William A. Powell
Assistant Examiner—Thomas Bokan
Attorney, Agent, or Firm—Parmelee, Bollinger & Bramblett

[57] ABSTRACT

In the case of an anti-slip chain, possessing an inner and outer holding device (4,5) which holds a chain-net, a tensioning chain-strand (7) runs from the inner holding device (4), over the tread of the tire, to the outer holding device (5). In order to guarantee that the tensioning chain-strand (7) is correctly guided in the region of the tread of the tire, the said strand is led through a sliding sleeve (9,11) which is located at the end of a track piece (3) and is comparatively long.

12 Claims, 6 Drawing Figures

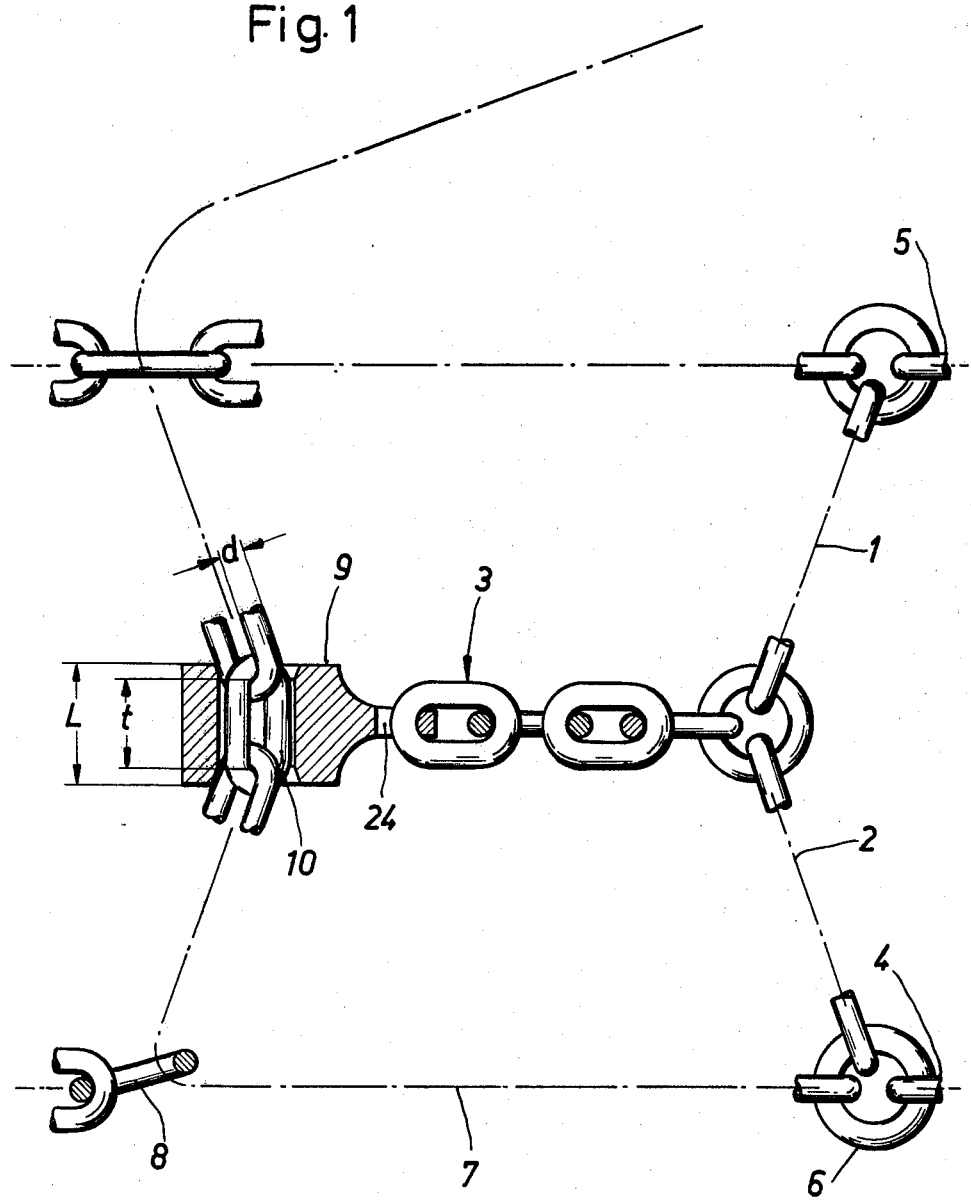

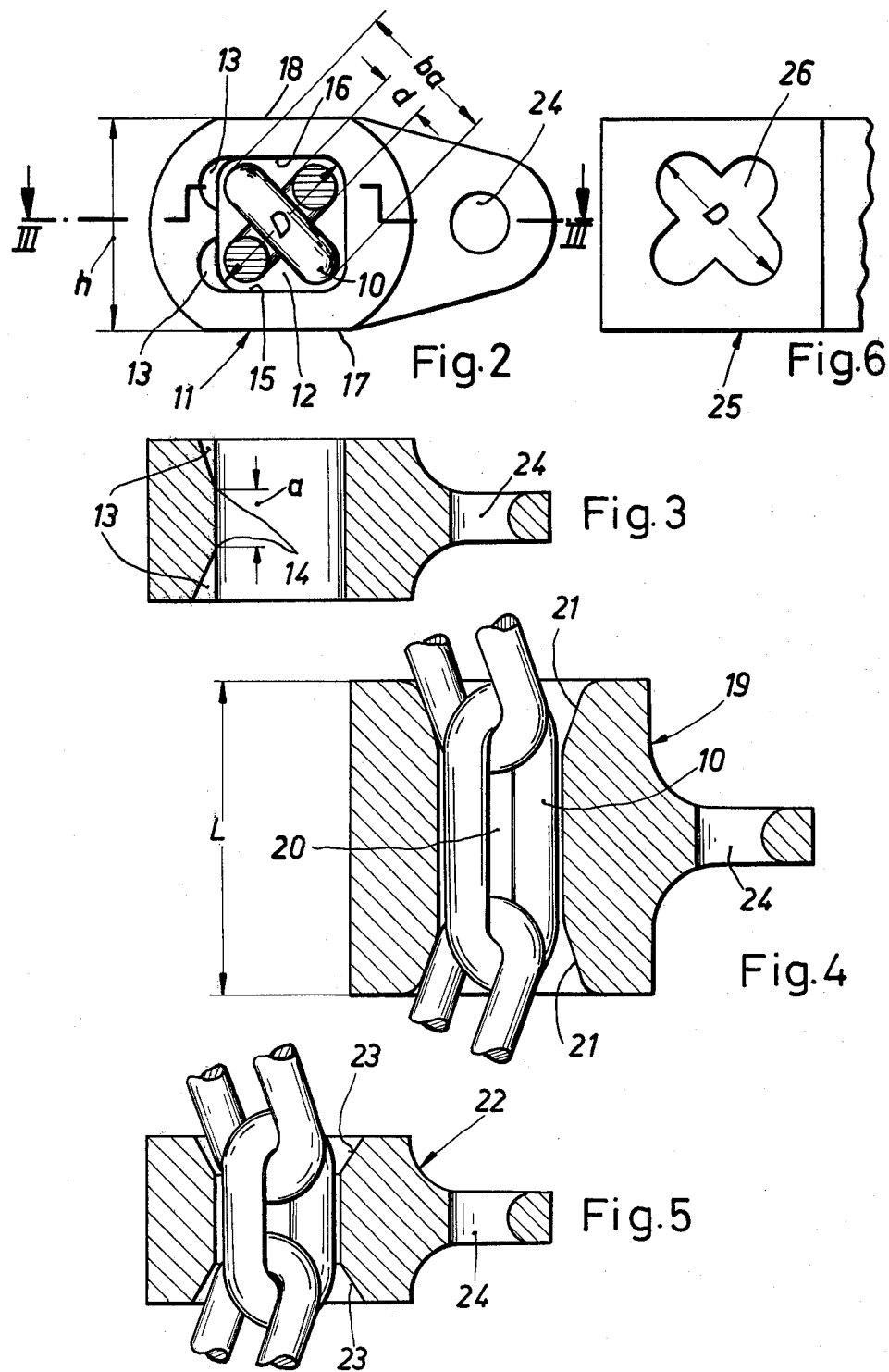

ANTI-SLIP CHAIN FOR VEHICLE TIRES

The invention relates to an anti-slip chain for vehicle tires, which has a running net possessing track pieces, these pieces being held by cross-chains extending at an angle to the direction of rotation, and in which a tensioning chain-strand, serving to tension an inner holding device for the cross-chains, is led from the inner holding device, over the tread, to an outer holding device this strand passing through a guide element which is located at the end of a track piece.

An anti-slip chain of the abovementioned type has been disclosed in German Offenlegungsschrift 2,254,409, in which the guide element, which is located at the end of a track piece, is formed by a ring-link arranged essentially parallel to the tread of the tire. The disadvantage of a design of this type resides in the fact that both the ring-link and that portion of the tensioning chain-strand, which after tensioning the chain, is situated in the region of this link are subjected to unfavourable stress conditions, resulting from the necessity to lead the tensioning chain-strand, on the one hand, over a portion of the ring-link and, on the other hand, through beneath another portion of this link, this necessity being a consequence of the horizontal position of the ring-link. In acknowledgement of the difficulty described, there has previously been a preference, in the case of anti-slip chains possessing tensioning chain-strands which are led from the rear side of the vehicle wheel to the front side of the wheel, for net-configurations in which the tensioning chain-strand runs from the rear side of the tire to its front side, without passing through any junction-points, whilst dispensing with a degree of homogeneity of the running net which is desirable per se (U.S. Pat. Nos. 2,130,293 and 2,537,392).

SUMMARY OF THE INVENTION

The object underlying the invention is to produce an anti-slip chain of the generic type described in the introduction, in the case of which the guide element is designed in a maner such that the tensioning chain-strand can easily pass through it and the tensioning chain-strand, together with a track-piece, forms a junction point possessing adequate strength. This object is achieved, according to the invention, in that the guide element is formed by a sliding sleeve, the length of which is greater than the difference of the pitch t of the links of the tensioning chain-strand and the link-wire diameter d of these links.

The anti-slip chain according to the invention offers the advantage that the sliding sleeve forms a guide-channel for the tensioning chain-strand and the latter is not subjected to unfavourable stress conditions in the region of the sliding sleeve. There is the additional advantage that the guidance of the tensioning chain-strand in the sliding sleeve is more effective than the guidance of a tensioning strand through a chain-link in the form of a circular ring. This latter advantage arises because the sliding sleeve bridges the gap between the noses of successive chain-links having the same orientation. Due to the fact that the sliding sleeve is comparatively long, it is possible to design this sleeve to be comparatively flat, whilst retaining an adequately large wear-volume. Finally, the resistance of the track piece to tilting is enhanced by the sliding sleeve, to which the said track piece is connected.

BRIEF DESCRIPTION OF THE DRAWINGS

Further details and features of the invention are evident from the sub-claims and from the following description of illustrative embodiments which are represented in the attached drawing, in which:

FIG. 1 shows a plan view of a portion of an anti-slip chain, unrolled and laid out flat;

FIG. 2 shows a side view of a sliding sleeve for an anti-slip chain according to FIG. 1;

FIG. 3 shows a section along the line III—III in FIG. 2;

FIG. 4 shows a section through a sliding sleeve of a modified design;

FIG. 5 shows a section through a further sliding sleeve and

FIG. 6 shows a portion of a sliding sleeve having a cruciform guide-channel.

DESCRIPTION OF THE PREFERRED EMBODIMENT

In FIG. 1, 1 is a portion of an anti-slip chain for vehicle tires, which has a running net possessing track pieces 3, these pieces being held by cross-chains 1 and 2 extending at an angle to the direction of rotation. An inner lateral chain 4 and an outer lateral chain 5 serve to secure the cross-chains. A tensioning chain-strand 7 is secured to the end, formed by a ring-link 6, of the lateral chain 4, this chain-strand passing through a guide ring 8 at the other end of the inner lateral chain 4, and then running, over the tread of the tire, to the outer lateral chain 5. In the region of the tread of the tire the tensioning chain-strand is led through a sliding sleeve 9, the length L of this sleeve being greater than the pitch t of the links 10 of the tensioning chain-strand 7.

The sliding sleeve 9 and the link 10 of the tensioning chain-strand 7 forms a junction-point, which, due to the comparatively long length L of the sliding sleeve 9 contributes to the resistance of the track piece to tilting.

FIGS. 2 and 3 show a particularly advantageous sliding sleeve 11. The sliding sleeve 11 possesses an essentially square guide-channel 12, the diagonals D of which are only a littler larger than the external width $b_a$ of the chain-links 10 of the tensioning chain-strand. The sliding sleeve 11 is provided with angled guide-flutes 13 at the inlet-corners of its guide-channel. The distance a between the inner extremities 14 of the guide-flutes 13 is at least equal to the difference of the pitch t of the links 10 of the tensioning chain-strand 7 and twice the link-wire diameter d of these links 10. The guide-flutes 13 ensure that the tensioning chain-strand 7 runs into the sliding sleeve 11 without jerking.

The guide-channel 12 possesses two inner walls 15,16 which extend essentially parallel to the tread of the tire, and two outer walls 17 and 18, which also extend essentially parallel to the tread of the tire. At the same time, the distance h between the outer walls 17 and 18 of the guide-channel, which extend parallel to the tread of the tire, is not greater than the sum of the exterior width $b_a$ of the links 10 of the tensioning chain-strand and twice the link-wire diameter d of these links 10.

The design, which has been described, of the guide-channel 12 ensures that the links 10 of the tensioning chain-strand 7 are located at an angle of approximately 45° to the tread of the tire, even in the region of the sliding sleeve 11, that is to say, at the same angle, relative to the tread of the tire, which they also assume outside the sliding sleeve 11.

FIG. 4 shows a sliding sleeve 19 which possesses a guide-channel 20 having corners 21 which have been rounded-off. The length L of this guide-channel is particularly large—it equals the pitch t of the link 10 plus twice its link-wire diameter.

FIG. 5 shows a sliding sleeve 22 with bevelled corners 23. All the sliding sleeves 9, 11, 19 and 22, which have been described, are each provided with an eye 24, into which the end link of a track piece 3 can be connected.

Finally, FIG. 6 shows the side view of a sliding sleeve 25, possessing an essentially cruciform guide-channel 26, the axes of this channel being located at an angle of approximately 45° to the tread.

We claim:

1. In an anti-slip chain for vehicle tires of the type having a running net including track pieces formed by chain strands connected to cross-chains extending at an angle to the direction of rotation, said cross-chains being held by an inner and an outer holding device, and in which a tensioning chain strand being attached to one end of the inner holding device and serving to tension said inner holding device is led from the inner holding device at an angle to the direction of rotation over the tread to the outer holding device, said tensioning chain strand passing through a guide element attached to one end of a track piece, the other end of said track piece being connected to said cross-chains, the improvement comprising:
said guide element being formed by a sliding sleeve (9;11) the length of which is greater than the difference of the pitch t of the links (10) of the tensioning chain strand (7) and the link wire diameter d of these links.

2. Anti-slip chain according to claim 1, characterized in that the length L of the sliding sleeve (9;11) is greater that the pitch t of the links (10) of the tensioning chain-strand (7).

3. Anti-slip chain according to claim 2, characterized in that the length L of the sliding sleeve (9) is essentially equal to the sum of the pitch t of the links (10) of the tensioning chain-strand (7) and twice the link-wire diameter d of these links.

4. Anti-slip chain according to claim 1 or 2, characterized in that the sliding sleeve (11) possesses a guide-channel (12) which is essentially square, the diagonals D of this passage being only slightly larger than the external width $b_a$ of the chain links (10) of the tensioning chain-strand (7).

5. Anti-slip chain according to claim 4, characterized in that the sliding sleeve (11) is provided with angled guide-flutes (13) at the entry-corners of its guide-channel (12).

6. Anti-slip chain according to claim 5, characterized in that the distance (a) between the inner extremities (14) of the guide-flutes (13) is at least equal to the differences of the pitch t of the links (10) of the tensioning chain-strand (7) and twice the link-wire diameter d of these links (10).

7. Anti-slip chain according to claim 4, characterized in that the guide-channel (12) possess two inner walls (15,16) which extend essentially parallel to the tread of the tire.

8. Anti-slip chain according to claim 4, characterized in that the guide-channel (12) possess two outer walls (17,18) which extend essentially parallel to the tread of the tire.

9. Anti-slip chain according to claim 8, characterized in that the distance h between the outer walls (17,18) of the guide-channel (12), which extend parallel to the tread of the tire, is no greater than the sum of the external width $b_a$ of the links (10) of the tensioning chain-strand and twice the link-wire diameter d of these links (10).

10. Anti-slip chain according to claim 4, characterized in that the corners (21) of the guide-channel (20) are rounded-off.

11. Anti-slip chain according to claim 1 or 2, characterized in that the sliding sleeve (25) possesses an essentially cruciform guide-channel (26), the axes of this channel being located at an angle of approximately 45° to the tread.

12. Anti-slip chain according to claim 1 or 2, characterized in that the sliding sleeve (9;11;10;22;25) is provided with an eye (24), into which the end link of a track piece (3) is connected.

* * * * *

UNITED STATES PATENT AND TRADEMARK OFFICE
CERTIFICATE OF CORRECTION

PATENT NO. : 4,390,053
DATED : June 28, 1983
INVENTOR(S) : Rieger & Holzwarth

It is certified that error appears in the above—identified patent and that said Letters Patent is hereby corrected as shown below:

On the title page of the above patent, after item "[22] Filed:", delete "Aug. 9, 1981" and insert -- Sept. 9, 1981 --.

On the title page of the above patent, the name of the Assignee should read:

-- RUD-Kettenfabrik Rieger & Dietz GmbH u. Co.

Signed and Sealed this

Thirtieth Day of October 1984

[SEAL]

*Attest:*

*Attesting Officer*

GERALD J. MOSSINGHOFF

*Commissioner of Patents and Trademarks*